Oct. 22, 1963 F. H. MATTESON ETAL 3,107,882
YAW CONTROL SYSTEM FOR VTOL TILT WING AIRCRAFT
Filed Aug. 10, 1962 3 Sheets-Sheet 1
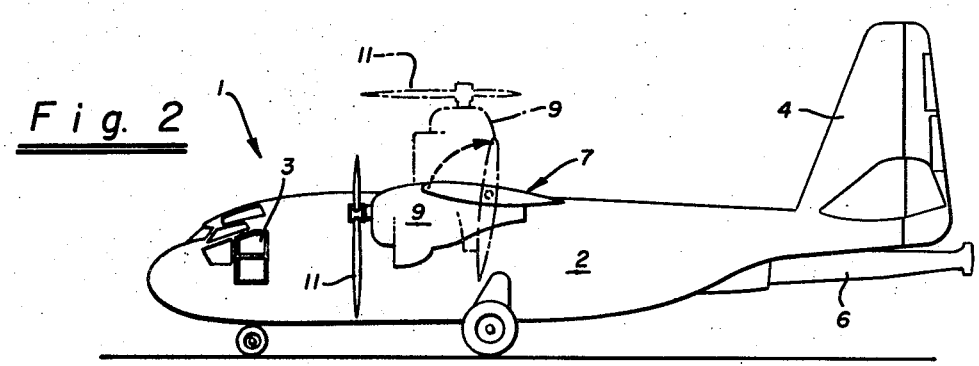
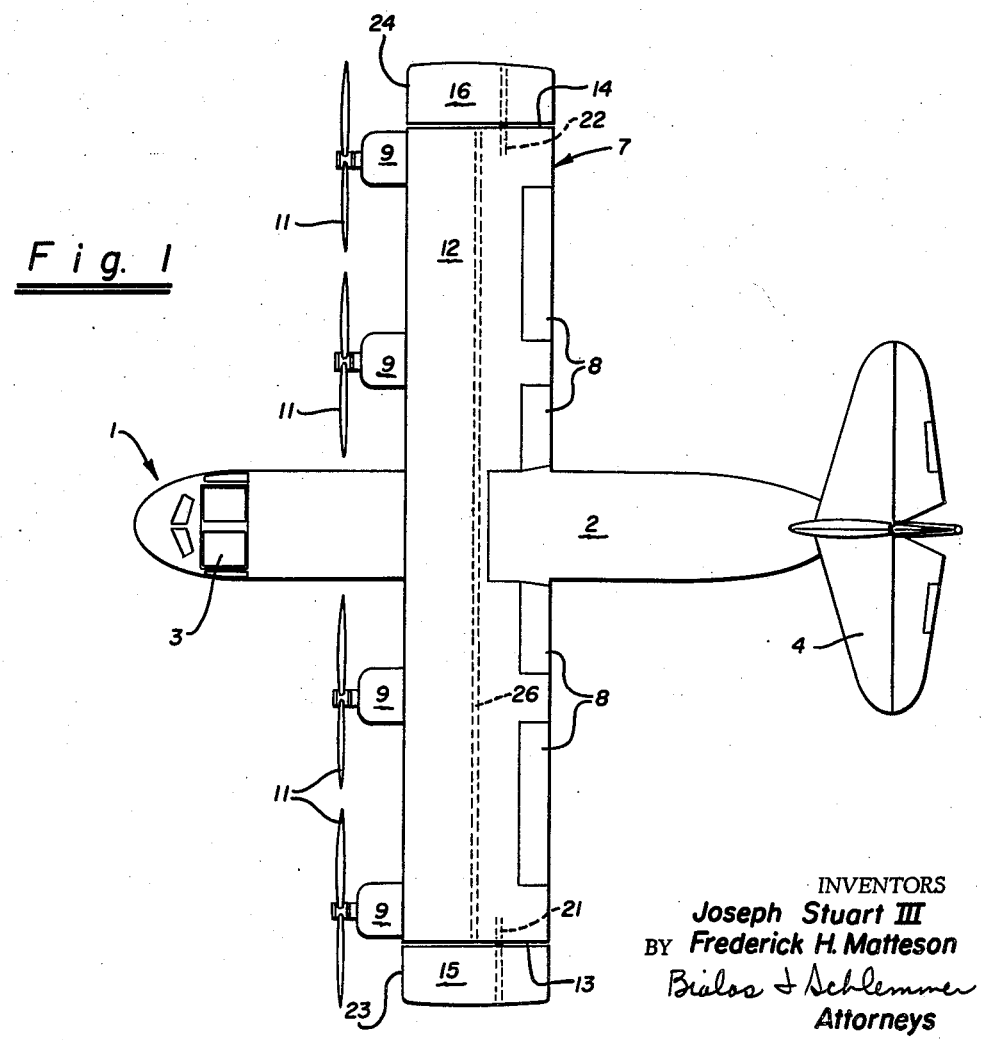
INVENTORS
Joseph Stuart III
BY Frederick H. Matteson
Bialos & Schlemmer
Attorneys INVENTORS
Joseph Stuart III
BY Frederick H. Matteson Attorneys

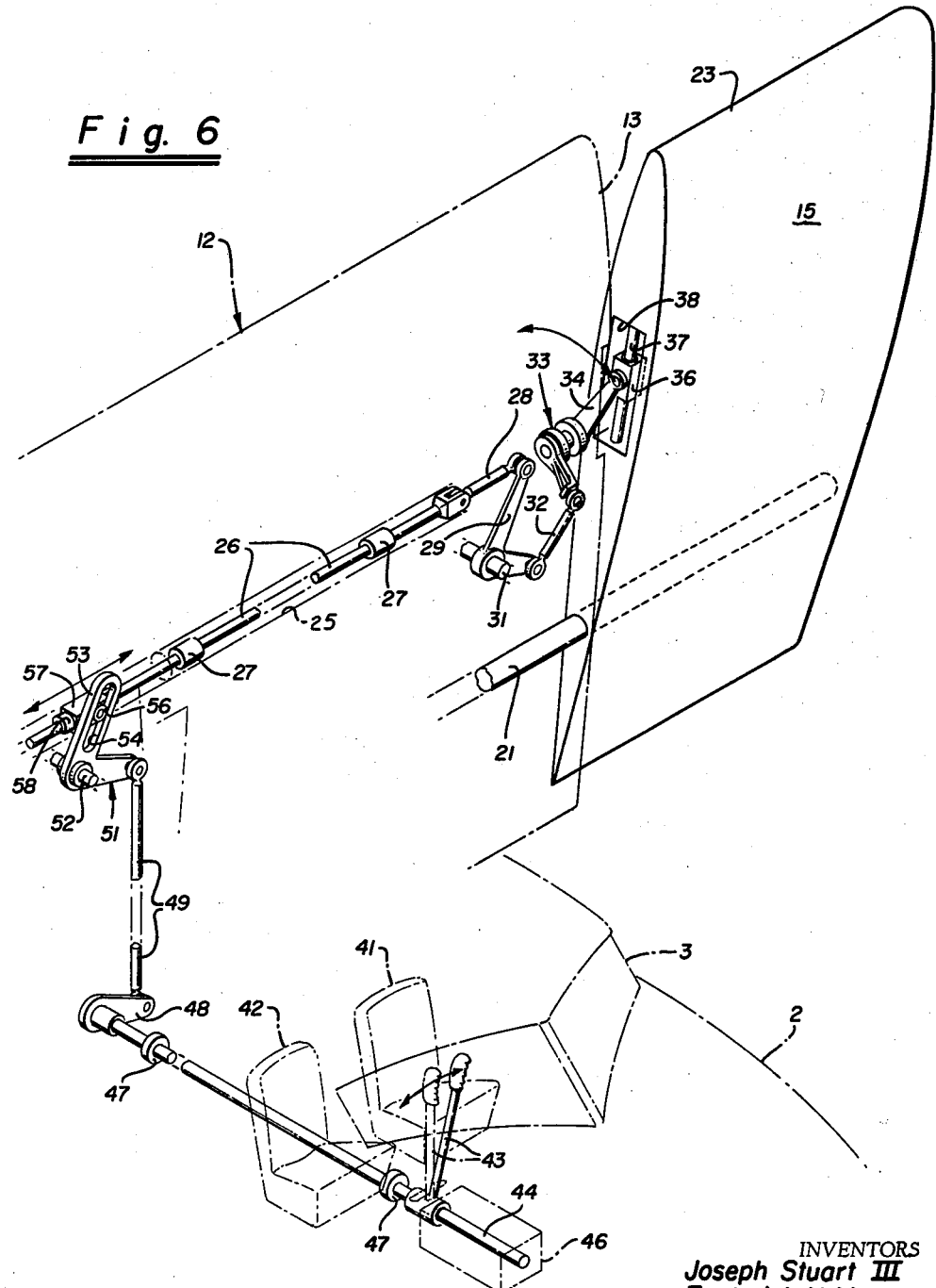

United States Patent Office 3,107,882
Patented Oct. 22, 1963

3,107,882
YAW CONTROL SYSTEM FOR VTOL
TILT WING AIRCRAFT
Frederick H. Matteson, Palo Alto, and Joseph Stuart III,
Redondo Beach, Calif., assignors to The Electric Auto-
Lite Company, Toledo, Ohio, a corporation of Ohio
Filed Aug. 10, 1962, Ser. No. 216,178
12 Claims. (Cl. 244—7)

This invention relates to a control system and to control means for an aircraft. More particularly, this invention relates to a control system for aircraft which is capable of vertical take-off and landing (VTOL) in which the wing structure of the aircraft extends transversely of the fuselage and is pivotally mounted for selective orientation relative thereto. That is, the wing structure is selectively pivotal between a generally horizontal or level position, in which the plane of the wing structure extends generally parallel to the longitudinal axis of the aircraft fuselage, and a generally upright or vertical position, in which the plane of the wing structure extends generally normal to the longitudinal axis of the aircraft fuselage.

Still more particularly, this invention relates to a control system for effectively regulating yaw of a tilt-wing type VTOL aircraft when its wing structure is oriented in a generally upright position with its plane extending generally normal to the longitudinal axis of the aircraft fuselage, particularly when the aircraft is hovering in flight close to the ground prior to landing or shortly after take-off.

While the control system means disclosed herein has particular utility when employed with a tilt-wing aircraft for regulating yaw thereof when the wing structure is oriented in the upright position, it should be understood that the subject invention also is available for use to control roll of the aircraft during forward flight of the aircraft when the wing is in the level position. As a result, the construction of this invention could be incorporated into a conventional fixed wing aircraft for controlling roll thereof. Primarily and preferably, however, the subject control means is employed for regulating yaw of a tilt-wing type aircraft and hereinafter reference will be directed to this preferred application of the invention. But the alternative use for roll control mentioned above is contemplated within the scope of this invention.

In summary, the subject invention relates to a control system for a tilt-wing type VTOL aircraft which includes air stream deflecting means which form part of, are operatively connected with, and project from opposite ends of the wing structure, preferably as substantial contoured continuations thereof. Such deflecting means comprises pivotal members which, when moved in opposite directions, serve to deflect the air stream flowing over the wing structure to thereby effect rotation of the aircraft about an axis which extends generally normal to the longitudinal axis of the wing structure. If the wing structure is oriented in the upright position, rotation of the aircraft is effectable about a vertical or upright axis so that aircraft yaw may be selectively controlled. If the wing structure is oriented in the horizontal position, rotation of the aircraft is effectable about a horizontal or longitudinal axis so that aircraft roll may be selectively controlled.

With certain heretofore known VTOL tilt-wing type aircraft, yaw control, when the wing structure of the aircraft is oriented in the upright position, has been effected by employing conventional ailerons provided in the trailing edge of the pivotal wing of the aircraft.

While ailerons in many vertical flight conditions are generally satisfactory for regulating yaw, in certain flight conditions ailerons have been found generally ineffective to provide adequate yaw control. For example, it has been found that ailerons, when a tilt-wing aircraft is hovering near the ground in the so-called "ground effect" zone, are generally ineffective for controlling yaw. This is generally due to several factors, such as impingement of the air stream on the ground forward and aft of the wing structure, which results in turbulence beneath the wing structure. Also, when an aircraft is hovering near the ground, the leading edge of the tilted wing structure divides the air stream flowing over the wing and, although the thus divided air stream generally flows over the wing surfaces, the air stream velocity diminishes as it approaches the ground before it again accelerates as it moves laterally over the ground surface. Thus, the air stream is traveling at comparatively low velocity when it contacts the ailerons and has little, if any, control effect on the ailerons.

It is factors such as these embodied in the "ground effect" of a hovering aircraft which preclude effective aileron operation for yaw control when the aircraft is near the ground.

Accordingly, this invention has been devised for effectively controlling yaw during all vertical flight and hovering conditions irrespective of the proximity of the aircraft to the ground. Because the control means employed are located at the outboard ends of the wing structure, they are capable of producing maximum yaw moments for highly effective yaw control.

From the foregoing it should be understood that objects of this invention include the provision of a control system for an aircraft; the provision of a control system for a VTOL tilt-wing type aircraft; the provision of a yaw control system for a tilt-wing type VTOL aircraft which is particularly effective when the wing is oriented in the upright position and the aircraft is hovering near the ground; the provision in a VTOL tilt-wing type aircraft of control means operable in an air stream flowing over the wing structure for deflecting the air stream to produce yaw moments for effecting rotation of the aircraft about a vertical axis; the provision in a control system for an aircraft of pilot operable means including interconnecting linkage structure for effecting differential movement of pivotal wing tip sections relative to each other; and the provision of wing structure having pivotal tip sections for a VTOL tilt-wing type aircraft.

These and other objects of this invention will become apparent from a study of the following disclosure in which reference is directed to the accompanying drawings.

FIG. 1 is a plan view of a VTOL tilt-wing type aircraft with which the subject invention is employed;

FIG. 2 is a side elevational view of the aircraft of FIG. 1;

FIG. 6 is a generally schematic view of the pilot operable structure for operating the control means of the subject invention.

Figure 4:
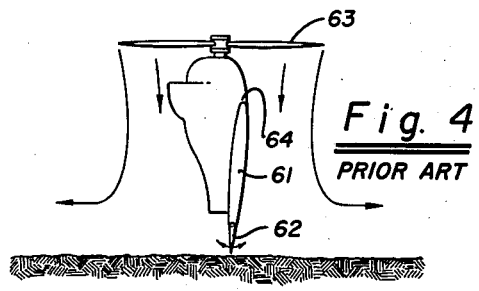
FIGS. 4 and 4A are schematic views of a wing structure of prior known aircraft employing ailerons for yaw control which respectively show the effectiveness of the ailerons in and out of the ground effect zone.

Referring first to FIGS. 1 and 2, an embodiment of a VTOL tilt-wing type aircraft with which the subject invention is usable has been shown. Such aircraft 1 comprises a fuselage 2 having a pilot station 3 at the forward end thereof and a tail structure 4 at the aft end thereof. Tail structure 4 is of conventional construction, but preferably a jet thrust pipe 6 or equivalent means is provided thereon for regulating pitch of the aircraft when the same is hovering, or moving vertically, or moving forward in low speed forward flight.

A wing structure 7 projects laterally from the fuselage and is pivotally connected therewith and supported thereby by any suitable means (not shown) so that the wing structure may be pivoted from the horizontal or level position shown in solid lines in FIGS. 1 and 2 to the vertical or upright position shown in dotted lines in FIG. 1. When the wing structure is horizontally oriented, the longitudinal plane of the wing structure extends generally parallel to the longitudinal axis of the fuselage, while such plane of the wing structure extends generally normal to the longitudinal axis of the fuselage when the wing is oriented upright.

Various means are employable for effecting selective pivotal movement and orientation of the wing structure in either the horizontal or vertical position, or in any intermediate position of transition therebetween, and, accordingly, such means has not been illustrated or described in detail. It should be understood, however, that when the wing is in the horizontal or level position the aircraft is operable as a conventional fixed wing aircraft for forward flight. However, when it is desired to effect vertical flight of the aircraft, or hovering, the wing structure is oriented in the upright or vertical position.

Aircraft of the type illustrated are designed for in-air transitional movement of the wing between its respective operative positions so that the aircraft may take off vertically, then be flown as a conventional aircraft, and subsequently landed vertically.

A series of conventional ailersons 8 may be provided along the trailing edge on the wing structure for effecting roll control of the aircraft during conventional forward flight in the well known manner.

Mounted on the wing structure for movement therewith as the wing structure moves between the horizontal and upright positions is thrust means for propelling the aircraft in flight. In the embodiment illustrated such thrust means comprise a series of motors 9 from each of which projects forwardly a thrust producing rotatable propeller 11 driven by its associated motor in the well known manner.

The series of propellers, when the same are activated by the motors, induce an aircraft propelling air stream rearwardly over the wing structure, and it is such air stream which is employed for controlling flight characteristics of this aircraft during vertical flight or hovering.

It should be noted that two of the motors desirably are mounted a substantial distance outboard of the wing structure so that the air stream induced thereby flows over the outboard ends of the wing structure for the purpose to be described.

While the wing structure in the embodiment of the aircraft shown is of one-piece construction in which the wing portions lying on opposite sides of the fuselage are integrally interconnected with each other for pivotal movement in unison, it should be understood that a wing structure in which discrete wing portions project from opposite sides of the fuselage also could be employed with the subject invention.

In the one-piece wing structure embodiment shown, the same comprises a central wing section 12 which is operatively connected pivotally with and projects in opposite directions from the aircraft fuselage. Such central wing section is provided with an airfoil contour of any suitable configuration determined by the type of aircraft on which the wing is mounted.

The subject control means forms part of the wing structure at opposite ends 13 and 14 of the central wing section and is pivotally mounted relative to such ends. Such control means comprises a pair of deflecting members 15 and 16 which project from the opposite ends of the central wing section and define wing tip end sections of the wing structure.

Figure 3:
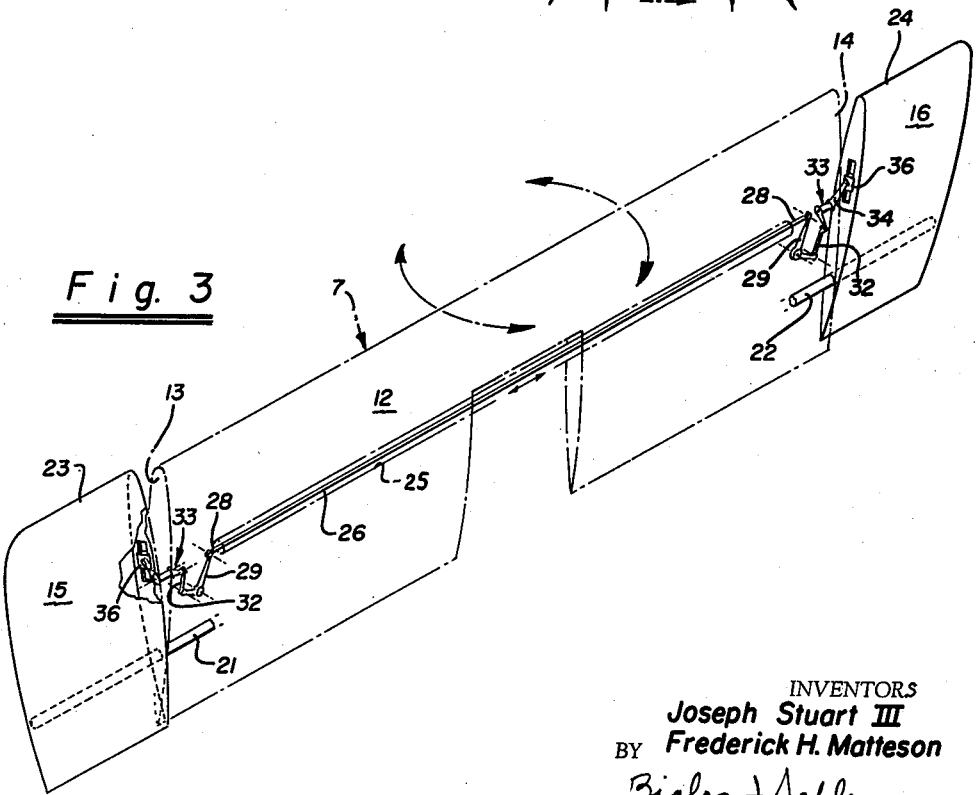
FIG. 3 is an isometric view of the subject wing structure employable with a VTOL tilt-wing type aircraft.

As best seen in FIGS. 3 and 6, the respective wing tip sections 15 and 16 are provided wtih an airfoil contour which corresponds substantially to and conforms with the contour of the central wing section 12. In this manner, the wing tip sections form full width continuations of the central section of the wing and, in effect, define the outboard ends of the wing structure.

These tip sections define pivotal control members for deflecting the air stream induced by the propellers over the wing structure for introducing rotational control moments on the aircraft principally for effecting modification of the flight characteristics of the aircraft when the same is off the ground. However, in this regard, it should be understood that such control members also can be employed for effecting aircraft control when the aircraft is supported on the ground. As noted from FIG. 1, the pivotal deflecting members 15 and 16 lie substantially within the air stream induced by the pair of outboard propellers.

While various means and mechanisms may be employed for operatively mounting the deflecting control members on the outboard ends of the central wing section, one particular embodiment has been shown in detail in FIGS. 3 and 6. The means shown comprises a pair of bearing rods 21 and 22, which are operatively secured to and project from the respective ends 13 and 14 of the central wing section into the respective tip sections 15 and 16. It is about the axes of rods 21 and 22 that the tip sections are pivotal.

As will be noted, the axes of rods 21 and 22 are aligned with each other but are positioned in offset relationship toward the trailing edge of the wing structure. As a result, the leading edges 23 and 24 of the respective tip sections may be extended to a greater degree into the air stream than would be possible if the pivot rods were positioned coincidentally with the chord midpoint of the wing structure. By securing the inner ends of the rods against separation from the central wing section while permitting rotation thereof relative to the central section in any suitable manner, and by securing the outer rod ends in the tip sections in any suitable manner, pivotal movement of the tip sections is possible.

The subject control means also includes mechanism operable by the pilot which operatively interconnects the tip sections for effecting movement thereof differentially but in unison relative to the central section. In this regard, it should be understood that the tip sections are moved by such mechanism in unison but in opposite directions so that the air stream impinges on opposite airfoil surfaces of the respective tip sections to provide the desired turning moments which result in rotation of the aircraft about a vertical or longitudinal axis depending upon the wing tilt position.

In the specific embodiment illustrated, the mechanism interconnecting the tip sections comprises linkage structure which extends substantially the full length of the central section 12 of the wing through a longitudinal passage 25. Such linkage includes a push-pull operating rod 26 slidably movable through a series of spaced bearings 27 located within passage 25. See FIG. 6. A short link 28 connects each of the opposite ends of the rod 26 with a bell crank 29 mounted for rotation about the axis of a shaft 31 mounted between the opposite surfaces of the wing structure.

Each bell crank 29 in turn is connected by another short link 32 to a second bell crank 33. One arm 34 of each bell crank 33 is positioned within a narrow gap which exists between the opposite ends 13 and 14 of the wing central section and the adjacent tip sections 15 and 16.

Each crank arm 34 is pivotally connected with a slide member 36 which in turn is slidably mounted on a guide rod 37 positioned in a recess 38 in the inboard end of each pivotal tip section. See FIG. 6.

As will be apparent from FIG. 3, the arrangement at opposite ends of the wing central section 12 is such that sliding movement of the push-pull rod 26 to the left in FIG. 3 will differentially effect clockwise movement of the tip section 15 and counterclockwise movement of tip section 16, as viewed in such figure. Conversely, movement of the push-pull rod 26 to the right in FIG. 3 will effect counterclockwise movement of tip section 15 and clockwise movement of tip section 16, as viewed in such figure.

In this manner, movement of the tip sections in different directions but in unison with each other may be effected merely by effecting the desired direction of movement of rod 26. Preferably the components which make up the linkage structure described are dimensioned so that pivotal movement of each tip section corresponds to the amount or degree of pivotal movement of the other tip section.

Means operable by the pilot at the pilot station 3 for effecting actuation of the push-pull rod 26 and pivotal movement of the tip sections selectively also forms part of the subject control means. In this regard, various pilot control means may be employed for actuating the wing tip sections selectively in all wing tilt positions, and one specific embodiment of control means is herein disclosed to complete this description. The pilot operable means in the specific embodiment illustrated comprises a mechanical linkage. However, it should be understood that, if desired, pulley and cable arrangements, as well as hydraulic or electrical arrangements to provide powered operation of the pivotal control members by the pilot of the aircraft could be employed.

In the specific illustrated embodiment, at pilot station 3 are provided conventional seats 41 and 42 for a pilot and copilot. Positioned between such seats so that the same is accessible by both the pilot and copilot is a pilot operable member 43 which, in the embodiment illustrated, takes the form of a pivotal control stick. Such stick is secured to a rotatable shaft 44 projecting rearwardly from the pilot station so that movement of the stick 43 to the right or left as viewed in FIG. 6 will effect corresponding clockwise or counterclockwise rotation of shaft 44.

The forward end of shaft 44 is operatively mounted for rotation in a forward bearing block 46 while a series of bearings 47 rotatably support the aft part of the shaft. The bearings mentioned may be supported by the aircraft fuselage in any suitable manner.

Connected with the aft end of the shaft 44 is a link 48 from which projects upwardly a push-pull rod 49 having pivotally connected to its upper end a bell crank 51 which is mounted for rotation in a vertical plane about the horizontal axis of a pivot shaft 52. The upper arm 53 of bell crank 51 is provided with an elongated slot 54 in which is movably received a roller 56 which projects laterally from a motion transmitting block member 57 positioned around the aforementioned push-pull rod 26.

It should be understood that block member 57 is precluded from longitudinal movement along the length of rod 26 by means to be described, but that rod 26 is not precluded from rotating about its axis within the block member. As a result, the wing structure is free to pivot between its horizontal and upright positions without interference from the linkage arrangement illustrated.

In the embodiment illustrated, to preclude movement of the block member 57 along the length of push-pull rod 26 relative to the rod, a pair of stop members 58 are positioned at opposite ends of the block member. Such stop members surround the rod and are keyed or otherwise secured firmly to the rod for rotation therewith to thereby preclude movement of block member 57 longitudinally relative to the rod without precluding rotation of the rod and block member relative to each other.

As a result, irrespective of the position of the wing structure, namely, horizontal, vertical or in any intermediate position, the pilot operable stick 43 is operatively connected with the push-pull rod 26 so as to be effective to position the pivotal tip sections 15 and 16 of the wing structure in any predetermined air stream deflecting position.

With the arrangement illustrated, referring to FIG. 6, if the pilot operable stick is moved to the left in FIG. 6 so that shaft 44 is pivoted counterclockwise in such figure, bell crank 51 will also be pivoted counterclockwise to urge push-pull rod 26 towards the left in FIG. 6. This will effect counterclockwise rotation of tip section 15 as viewed in FIG. 6 and opposite clockwise rotation of the opposite tip section 16. Conversely, movement of the pilot operable stick 43 to the right as viewed in FIG. 6 will effect the opposite differential rotation of the tip sections relative to each other.

From the foregoing, it should be understood that, irrespective of the orientation of the wing structure, the pilot at all times can directly control the position of the pivotal tip sections, so that accurate control of the aircraft may be effected under all flight conditions.

While a hand operated control stick 43 has been illustrated for regulating the pivotal tip sections in the aircraft embodiment illustrated, it should be understood that foot controls also could be employed if preferred with only minor modifications of the construction shown being required.

Referring now to FIGS. 4, 4A, 5 and 5A, a comparison of the subject control means and the improved control effect produced thereby with heretofore known aileron type controls will be discussed.

Figure 4A:
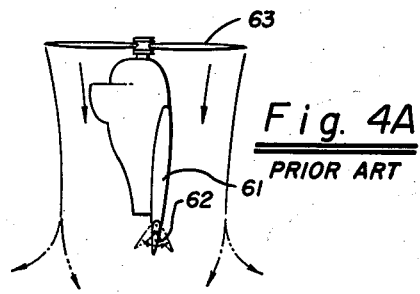

Referring first to FIG. 4A, part of a heretofore known aircraft is shown schematically in which a wing structure 61 has pivotal ailerons 62 mounted on the trailing edge of the wing so as to lie in the air stream produced by a motor driven propeller 63 mounted on the wing. As mentioned previously, such ailerons are generally effective when the aircraft is out of the "ground effect" zone for deflecting the air stream to create yawing moments. However, when such an aircraft is hovering close to the ground, as shown in FIG. 4, conventional ailerons have been found ineffective to deflect the air stream to provide the suitable yaw moments required to effect rotation of the aircraft about a vertical axis.

This is due to the aforementioned "ground effect" factors, such as the velocity of the air stream diminishing as it approaches the ground as it passes over the ailerons and prior to the air stream moving laterally over the ground at increased velocity. As a result of the "ground effect" factors, the ailerons cannot adequately operate in the air stream to produce the required yaw moments. This condition is further aggravated by the turbulence produced by the air stream impinging upon the ground so that proper control cannot adequately be provided by ailerons provided on the trailing edge of the wing structure.

Figure 5:
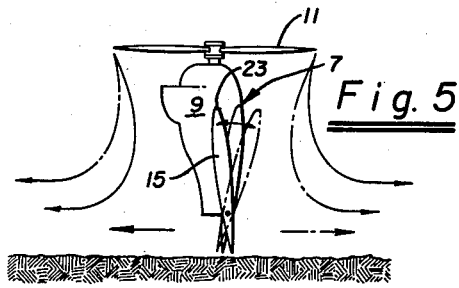
FIGS. 5 and 5A are generally schematic views of the improved wing structure of the subject invention which respectively show the effectiveness thereof in and out of the ground effect zone.
Figure 5A:
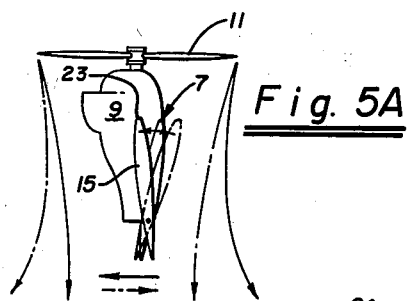

The effectiveness of the subject control system is shown in FIGS. 5 and 5A. The pivotal tip sections which form the outboard ends of the wing structure of the subject aircraft are effective to deflect the air stream flowing over the wing structure irrespective of whether or not the aircraft is operating close to the ground in the "ground effect" zone. That is, the leading edges of the pivotal tip sections may be moved a substantial distance into the air stream to insure impingement of the air stream at high velocity upon the tip sections to provide the required yawing moments for effecting rotation of the aircraft about a vertical axis.

From the foregoing, therefore, it should be evident that the pivotal tip sections which are embodied in this invention are effective under all flight conditions of the aircraft when the same is moving vertically or is operating close to or spaced from the ground as seen in FIGS. 5 and 5A.

Similarly, it should be appreciated and understood that the tip sections, when pivoted out of the plane of the central section of the wing, are effective to produce yawing moments whenever the wing structure is out of the horizontal position. That is, as the wing is pivoted from the horizontal position towards the upright position, the yaw control effects of the pivotal tip sections progressively increase until the yaw moments reach a maximum when the wing reaches the full upright position.

It should also be appreciated that the pivotal tip sections can be employed differentially and would be effective for regulating roll of the aircraft when the wing is in the horizontal or level position. However, the roll control effectible with the subject control means is an auxiliary advantage of the subject invention which may be employed if desired.

While not shown in the drawings, if found desirable, suitable fairings may be employed over the opposite ends of the wing central section 12 and the adjacent tip sections 15 and 16 to cover the gap existing therebetween, so long as such fairings do not interfere with free pivotal movement of the wing section as heretofore described.

Having thus made a full disclosure of this invention, reference is directed to the appended claims for the scope to be afforded thereto. In this regard, modifications to the invention disclosed herein which may become obvious to one skilled in the art after he has studied this disclosure are contemplated as falling within the scope of the appended claims.

We claim:

1. A tilt-wing type VTOL aircraft which includes a fuselage, selectively orientable wing structure extending transversely of said fuselage which is pivotal relative thereto between a first generally horizontal position in which the plane of said wing structure is generally parallel to the longitudinal axis of said fuselage and a second generally upright position in which the plane of said wing structure is generally normal to the longitudinal axis of said fuselage, thrust means fixedly mounted on said wing structure for movement therewith between said positions, said thrust means when activated producing an air flow stream over said wing structure, yaw control means on said wing structure positioned in said air flow stream for dividing said air flow stream selectively for effecting rotation of said aircraft about its vertical axis during flight when said wing structure is oriented out of said first position, said yaw control means comprising pivotal deflecting members mounted at the outboard ends of said wing structure, means mounting said deflecting members for pivotal movement independently of said thrust means on said wing structure, and pilot operable mechanism for pivoting said members selectively and differentially in said air flow stream.

2. A tilt-wing type VTOL aircraft which includes a fuselage, selectively orientable wing structure extending transversely of said fuselage which is pivotal relative thereto between a first generally horizontal position in which the plane of said wing structure is generally parallel to the longitudinal axis of said fuselage and a second generally upright position in which the plane of said wing structure is generally normal to the longitudinal axis of said fuselage, thrust means fixedly mounted on said wing structure for movement therewith between said positions, said thrust means when activated producing an air flow stream over said wing structure, yaw control means on said wing structure position in said air flow stream for dividing said air flow stream selectively for effecting rotation of said aircraft about its vertical axis during flight when said wing structure is oriented generally in said second upright position, said yaw control means comprising airfoil contoured pivotal deflecting members projecting outwardly from opposite ends of said wing structure as substantial outboard continuations thereof, mechanism operatively mounting said members for pivotal movement in said air flow stream independently of said thrust means on said wing structure, and pilot operable mechanism operatively connected with said members for pivoting said members simultaneously and to generally equal degree in opposite directions for effecting yaw control during vertical and hovering flight of said aircraft.

3. In a VTOL tilt-wing aircraft which includes a fuselage, wing structure extending transversely of said fuselage, means pivotally mounting said wing structure on said fuselage, and thrust means fixedly mounted on said wing structure and pivotal therewith, said thrust means when activated inducing an air stream to flow over said wing structure; a system for dividing said air flow stream for selectively controlling flight characteristics of said aircraft comprising pivotal members on said wing structure at opposite ends thereof, said members forming substantial outboard continuations of said wing structure and lying in said air stream when said thrust means is activated, mechanism pivotally mounting said members on said wing structure for pivotal movement differentially relative to and independently of said thrust means on said wing structure, and other mechanism operable by the pilot of said aircraft operatively connected with said members for pivoting said members in unison but in opposite directions.

4. In a tilt-wing type aircraft which includes a fuselage, pivotal wing structure extending transversely of said fuselage which is selectively orientable between a generally horizontal position and a generally vertical position, and thrust means fixedly mounted on said wing structure and pivotal therewith, said thrust means comprising engine driven propellers which when activated induce an air stream to flow over opposite end portions of said wing structure; a system for controlling yaw of said aircraft in flight when said wing structure is generally in said upright position by dividing selectively said air stream, comprising pivotal airfoil contoured members on said wing structure at opposite ends thereof, said members forming substantial outboard continuations of said wing structure and lying in said air stream when said propellers are activated, mechanism pivotally mounting said members on said wing structure for pivotal movement differentially relative thereto and independently of said propellers thereon, and other mechanism operable by the pilot of said aircraft operatively connected with said members for pivoting said members in unison but in opposite directions.

5. The aircraft of claim 4 in which said pilot operable mechanism includes linkage structure extending between and operatively interconnecting said pivotal members for movement in unison, and other means actuated by a pilot for effecting actuation of said linkage structure.

6. In combination, wing structure and thrust means for a VTOL tilt-wing aircraft comprising a central wing section of airfoil contour, thrust means fixedly mounted on said central wing section adjacent opposite ends thereof, discrete opposite end wing sections of airfoil contour, and means operatively connecting said end sections pivotally with said central section as substantial contoured continuations thereof, said pivotal connecting means including structure operatively interconnecting said end sections with each other for effecting pivotal movement thereof in unison in opposite directions relative to said central section and independently of said thrust means on said central section.

7. For use in a tilt-wing type VTOL aircraft, in combination, pivotal wing structure for said aircraft comprising a central wing section of airfoil contour and thrust means on said central wing section adjacent opposite ends thereof, discrete opposite end wing sections of airfoil contour on said wing structure, and means operatively connecting said end sections pivotally with said central section as substantial contoured continuations thereof, said pivotal connecting means including structure operatively interconnecting said end sections with each other for effecting pivotal movement thereof in unison in opposite directions relative to said central section and independently of said thrust means thereon, said structure being operatively connectable with means operable by the pilot of such aircraft for effecting pivotal movement of said end sections.

8. In combination, wing structure and thrust means for a VTOL tilt-wing aircraft comprising a central wing section of airfoil contour, thrust means fixedly mounted on said central wing section adjacent opposite ends thereof, discrete opposite end wing sections of airfoil contour, and means operatively connecting said end sections pivotally with said central section as substantial contoured continuations thereof, said pivotal connecting means including supporting rods projecting from opposite ends of said central section into said end sections about the axes of which said end sections are pivotal, and linkage structure extending through said central section and operatively interconnecting said end sections with each other for effecting pivotal movement thereof in unison in opposite directions relative to said central section and independently of said thrust means on said central section.

9. A VTOL aircraft of the tilt-wing type comprising a fuselage, a pilot's station in said fuselage, wing structure extending transversely of said fuselage and pivotal relative thereto between first and second positions, said wing structure when in said first position being generally level with its plane extending generally parallel to the longitudinal axis of said fuselage, said wing structure when in said second position being generally upright with its plane extending generally normal to the longitudinal axis of said fuselage, a plurality of thrust producing propellers operatively and fixedly mounted for rotation on said wing structure, said propellers being pivoted with said wing structure and when activated inducing flow of an air stream over said wing structure including outer ends thereof, an airfoil contoured air stream dividing control member mounted on each end of said wing structure, the contour of said control members conforming generally to the contour of said wing structure so that said members form substantial continuations of said wing structure, means operatively mounting said members on said wing structure for pivotal movement relative thereto in said air stream independently of said propellers when said propellers are activated, linkage structure in said wing structure extending between said members and operatively interconnecting the same for pivotal movement in opposite directions, a pilot operable member at said pilot station, and mechanism interconnecting said pilot operable member with said linkage structure whereby said control members may be pivoted selectively in opposite directions by said pilot from said pilot's station.

10. Control means for a VTOL type aircraft which includes pivotal wing structure for regulating yaw of said aircraft when said aircraft is hovering near the ground with its wing structure tilted to a generally upright position, said aircraft having thrust means fixedly mounted on said wing structure for pivotal movement therewith and for inducing flow of an air stream over opposite ends of said wing structure; said control means including pivotal wing tip sections projecting as substantial continuations of said opposite ends of said wing structure, means mounting said tip sections for pivotal movement generally in said air stream independently of said thrust means, and other means for effecting selective pivotal movement of said tip sections in opposite directions for dividing and deflecting said air stream for effecting controlled rotation of said aircraft about a vertical axis.

11. In a VTOL aircraft of the tilt-wing type in which the wing structure of such aircraft is pivotally orientable selectively between a generally horizontal position for forward flight and a generally upright position for vertical flight and hovering, control means on said wing structure for movement therewith when said wing structure is pivoted between said positions, a rotatable propeller fixedly mounted adjacent each of the opposite ends of said wing structure for inducing flow of an air stream over said wing ends under all flight conditions when said propellers are activated, and means for activating said propellers; said control means comprising air foil contoured members projecting in opposite directions from said opposite ends of said wing structure and lying in said propeller induced air stream, said contoured members forming substantial continuation of said wing structure; mechanism pivotally mounting said contoured members at said wing ends for pivotal movement in said air stream during flight of said aircraft, said pivotal mounting mechanism supporting said contoured members for pivotal movement independently of said rotatable propellers fixedly mounted on said wing structure, and pilot operable means for selectively pivoting said contoured members independently of said propellers in said air stream for dividing said air stream selectively, whereby when said wing structure is oriented in said upright position for vertical flight and hovering differential pivotal movement of said contoured members in said air stream effects yaw control rotation of said aircraft about a vertical axis irrespective of the proximity of said aircraft to the ground during such vertical flight or hovering.

12. The VTOL aircraft of claim 11 in which said contoured members are pivotal at said opposite wing ends about an axis positioned rearwardly of the chord midpoint of said wing structure.

References Cited in the file of this patent

UNITED STATES PATENTS

| | | |
|---|---|---|
| 2,108,093 | Zimmerman | Feb. 15, 1938 |
| 2,708,081 | Dobson | May 10, 1955 |

OTHER REFERENCES

Interavia, February 1959, page 166.